UNITED STATES PATENT OFFICE.

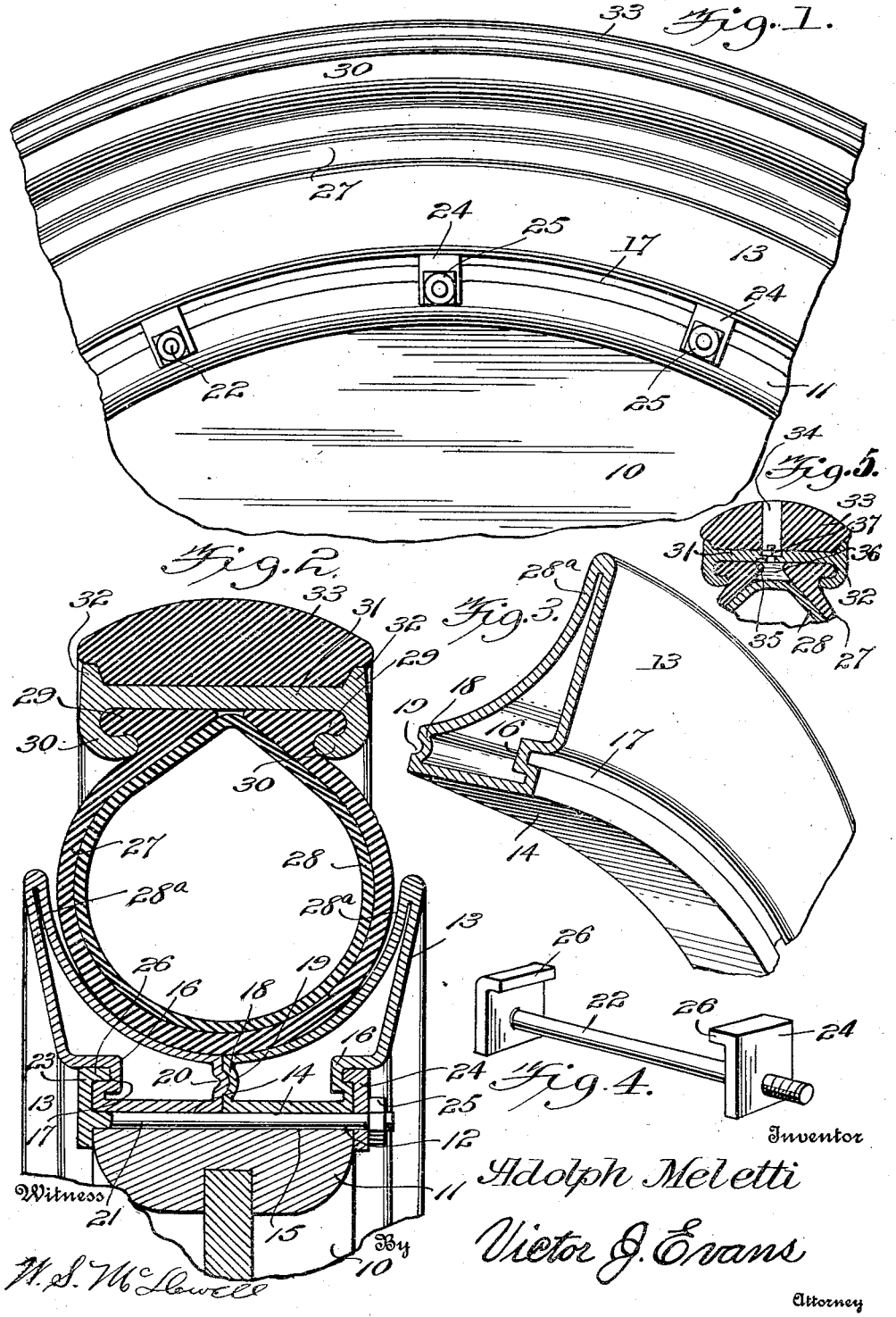

ADOLPH MELETTI, OF BEVERLY, NEW JERSEY, ASSIGNOR OF ONE-FOURTH TO HENRY WALTER AND ONE-FOURTH TO ALBERT L. PANCOAST, BOTH OF RIVERSIDE, NEW JERSEY.

RESILIENT WHEEL.

1,277,984.  Specification of Letters Patent.  Patented Sept. 3, 1918.

Application filed February 7, 1916. Serial No. 76,728.

*To all whom it may concern:*

Be it known that I, ADOLPH MELETTI, a subject of the King of Italy, residing at Beverly, in the county of Burlington and State of New Jersey, have invented new and useful Improvements in Resilient Wheels, of which the following is a specification.

The invention relates to wheels for vehicles and the like, and has for an object the provision of a wheel of great resiliency and wearing properties, combining durability of structure and lightness of weight with certain pneumatic effects desired in a wheel of this character.

Among other features the invention comprehends a wheel having its various parts arranged so that the same can be readily and quickly assembled and disassembled for the substitution or repair of old or worn parts.

Still further the invention comprehends a wheel in which the annoyances and dangers of punctures and blow-outs are avoided, the wheel however having desirable cushioning effects to insure easy and smooth riding over the highway, of a vehicle equipped with wheels of the mentioned character.

In the further disclosure of the invention reference is to be had to the accompanying drawings, constituting a part of this specification, in which similar characters of reference denote corresponding parts in all the views, and in which, Figure 1 is a fragmentary side elevation showing a portion of the wheel:

Fig. 2 is an enlarged transverse sectional view taken through the wheel:

Fig. 3 is a fragmentary perspective view of one of the side pieces:

Fig. 4 is a perspective view of one of the fastening elements, and

Fig. 5 is a detail sectional view.

Referring more particularly to the views I disclose the usual wheel body 10, including a rim 11 of any preferred design having grooves or openings 12, as the case may be, at spaced distances around the rim, the grooves being formed transversely of the rim as shown. Side pieces 13, preferably of metal and hollow, are provided for disposition on the rim, each side piece being circular and having a flat or smooth inner face 14 fitting against the outer face 15 of the rim. The character 16 denotes an inwardly projecting annular portion formed near the inner margin of the side face 13 providing each of the side pieces with an exterior annular groove 17 whereas the inner edge 18 of each side piece is adapted to interengage with the other by providing the edge of one side piece with a groove 19 and the opposite piece with a bead 20. Thus when the side pieces are placed upon the rim their inner edges will abut and interfit as clearly shown shown in Fig. 2.

Fastening elements 21 are provided to secure the side pieces 13 to the rim, each element comprising a stem 22 having a lug 23 formed at one end thereof and a similar lug 24 for disposition on the other or free end of the stem, the latter end being threaded for the application of a suitable nut 25 thereon. Each lug 23, 24, is formed with a flange 26, with the flange on one lug extending in one direction and the flange on the other lug extending in the opposite direction. Referring carefully to Fig. 2 it will be clear that the flanges of the lugs fitting into the grooves on the side pieces will, when the stem is disposed in the groove or opening 12 secure the side pieces rigidly upon threading the nut 25 upon the threaded portion of the stem 22, thereby also interfitting and locking the bead 20 in the groove 19.

A casing 27 of rubber, canvas or some suitable composition incloses a pneumatic tube 28 and the major portion of the casing is adapted to lie in the flared portion 28ª of the side pieces 13, the latter being curved and flared sufficiently to amply accommodate the casing when the same is compressed by pressure. The casing 27 is somewhat the shape and design of the usual shoe now generally forming a part of the usual tire, the casing therefor having enlarged annular flanges 29 fitting within and encompassed by annular ribs 30 of a plate 31 formed with annular projections 32, securing a preferably solid shoe 33 to the plate 31.

Referring now to Fig. 2 in connection with the last mentioned parts of the structure, it will be seen that upon deflating the tube 28, the flanges 29 can be removed from engagement with the ribs 30 and the casing and tube removed from the plate and side pieces to permit of repairing the casing or tube or substituting new parts therefor. So also the side pieces can be removed by unscrewing the nuts 25 from the stems of the fastening elements 21, thereby permitting of readily taking the entire structure apart for the purposes heretofore mentioned.

From the foregoing it will be apparent that the entire device consisting of few and simple parts, can be constructed to present great durability of structure and effectively perform the functions for which it is intended, the various parts being readily accessible when in need of repair.

Although I have shown and described a particular form of my invention it will be understood that I do not limit myself to the detailed construction set forth herein and that various slight changes may be made, provided I do not depart from the spirit of the invention, the scope of which is defined in the appended claim.

In order to prevent disconnection between the tire 27 and the rim 31 in the event of a "blow-out" or puncture occuring to said tire, the tread 33 is provided at spaced intervals with radial bores 34 arranged in alinement with openings 35 formed in the rim 31. The openings 35 are adapted to receive tire locking lugs 36 which engage with the tire section 27 and frictionally grip the same, by the action of adjusting nuts 37 to securely connect said tire section with the rim 31. The bores 34 permit a suitable form of wrench to be inserted within the tread 33 to regulate the action of said locking lugs 36. The construction described in this paragraph has been particularly illustrated in Fig. 5 of the drawing.

Having described my invention, I claim:

In a resilient wheel, rim members provided at their outer sides with grooves, securing devices engaging in said grooves, said rim members being provided respectively at their inner portions with a groove and bead which engage each other, a casing mounted on said rim members, an annular plate surrounding said casing and having means which engage the edge portions of the same.

In testimony whereof I affix my signature in presence of two witnesses.

ADOLPH MELETTI.

Witnesses:
HERBERT O. ZIEGLER,
CHAS. H. ZIEGLER.

Copies of this patent may be obtained for five cents each, by addressing the "Commissioner of Patents, Washington, D. C."